REMOTELY CONTROLLED SELECTIVE SWITCHING SYSTEM

Filed April 25, 1960 2 Sheets-Sheet 1

INVENTOR
S. T. BREWER
BY
ATTORNEY

INVENTOR
S. T. BREWER
BY
Charles Scott Phelan
ATTORNEY

United States Patent Office 3,060,390
Patented Oct. 23, 1962

3,060,390
REMOTELY CONTROLLED SELECTIVE SWITCHING SYSTEM

Sherman T. Brewer, Chatham Township, Morris County, N.J., assignor to Bell Telephone Laboratories, Incorporated, New York, N.Y., a corporation of New York Filed Apr. 25, 1960, Ser. No. 24,324
14 Claims. (Cl. 333—3)

This invention relates to remote controlling arrangements, and it is described in connection with arrangements in a submarine cable system for selectively initiating from a cable system terminal an action which is to take place in a remote one of a plurality of inaccessible repeaters in the cable system.

In transmission systems which include a plurality of inaccessible repeaters it is well known to cause an action to take place at a selected remote repeater by transmitting oscillations at a certain control frequency. The frequency is passed by a narrow band filter at the selected remote repeater and subsequently initiates the desired operation. Each remote repeater has its own characteristic narrow control frequency band and corresponding filter.

There are, however, certain disadvantages in using different bandpass filters at each remote location. For example, a separate filter must be designed and manufactured for each location in the system at which a remotely controlled operation is to take place, and an inventory of a corresponding number of differently designed filters must also be maintained as spares. The use of such individual filters and the maintenance of the necessary inventory of spares is an expensive proposition in terms of both dollars and storage space.

Another disadvantage of the separate narrow band filter arrangement is that each filter must employ a large number of components and a critical design in order to assure reliable operation and to keep to a minimum the width of the control frequency band that must be allotted to the system. The large numbers of components required for each filter increase the probability of a system fault and increase the size of the filter, thereby increasing the cable handling problems both in storing and in laying operations.

If a cable system employs redundant working and spare amplifiers in each repeater to improve the long term reliability of the repeater, the above-mentioned difficulties are considerably multiplied because each amplifier of each repeater requires its own separate associated control filter.

It is therefore one object of the invention to facilitate remotely controlled operations.

Another object is to reduce the bulk and expense of inaccessible repeaters with redundant amplifiers, as well as reducing the bulk and expense of maintaining an inventory of spare components for cable transmission systems.

An additional object is to improve the reliability of submarine cable repeaters while making maximum use of existing repeater components.

An illustrative embodiment of the invention in which the stated objects and other objects and features are realized includes an arrangement for remotely switching working and spare amplifiers in selected repeaters of a submarine cable system. Each amplifier includes a piezoelectric signature crystal connected in shunt in a negative feedback circuit for producing a voltage pulse in the amplifier output in response to the application of the signature frequency from one cable terminal. Such pulses are transmitted through the cable system to another system terminal if generated in a working amplifier and are coupled to a switching control circuit if generated in a spare amplifier. Each control circuit includes a filter that has a pass-band embracing all of the signature frequencies employed in the entire cable system. A gate device is also utilized in the control circuit to render it responsive to only those signature pulses in a certain restricted amplitude range which are generated by the amplifier without significant negative feedback. A relay actuated by the control circuit interchanges the output connections of the working and spare amplifiers.

Additional meritorious aspects of the invention will become apparent upon considering the following description of the mentioned illustrative embodiment, and the appended claims, taken in connection with the attached drawing in which:

Figure 1:
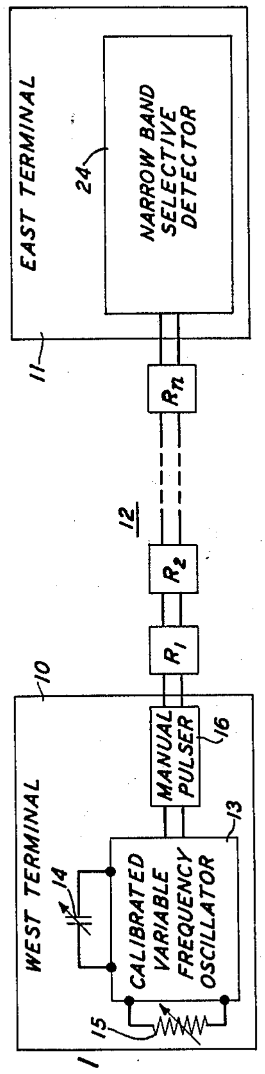
FIG. 1 is a block and line diagram of a submarine cable transmission system employing the invention.

The submarine cable system illustrated in FIG. 1 includes a west terminal 10 and an east terminal 11 interconnected by means of a submarine cable 12 which includes the spaced signal repeaters R1 through $R_n$. West terminal 10 includes a calibrated variable frequency oscillator 13 and a manual pulser 16 for applying a burst of oscillations of a predetermined frequency to the cable 12. These bursts of oscillations are employed for initiating a control operation in one of the repeaters. The particular repeater affected is determined by the frequency applied from the oscillator 13 as will be subsequently described. Pulser 16 may be any suitable switching device to enable an operator to select a particular output frequency from the oscillator 13 at his local terminal before applying the oscillations to the cable 12. In this fashion, the false operation of repeaters other than the selected repeater is avoided as the output of oscillator 13 is swept to the desired frequency. Oscillator 13 includes a variable capacitor 14 for adjusting the output frequency and an adjustable resistor 15 for adjusting the amplitude of output oscillations.

East terminal 11 includes a narrow band selective detector 24 for co-operating with oscillator 13 to check repeater operation in a known manner to be described.

Figure 2:
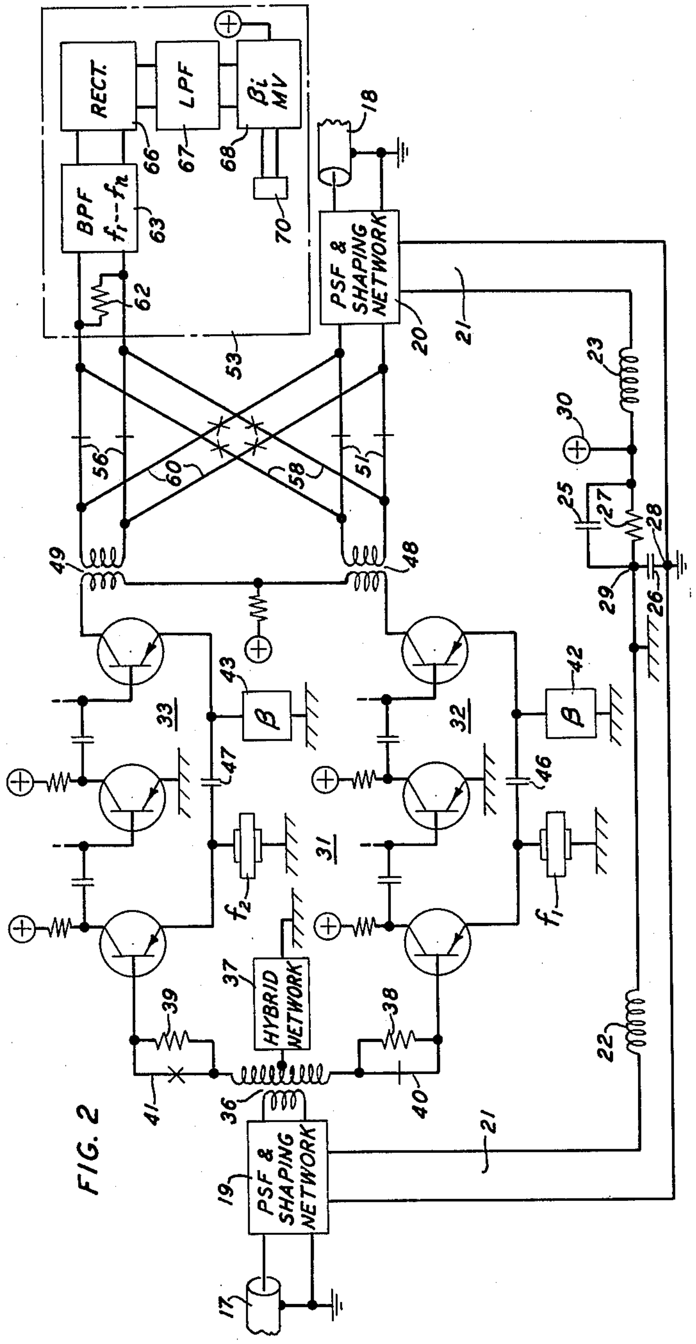
FIG. 2 is a simplified schematic diagram illustrating the relevant details of a repeater for a cable transmission system in accordance with the invention.

Illustrated in FIG. 2 is a schematic diagram for a typical repeater that may be used in the cable 12. A two-wire repeater suitable for transmission in only one direction is shown in order that the drawing may be kept as simple as possible to bring out the functions and features of the invention. It will be apparent to those skilled in the art, however, that the principles of the invention may be readily applied to equivalent four-wire repeaters.

An input cable section 17 supplies to the repeater input over the same two conductors alternating voltages for both signaling and control purposes. An output cable section 18 is connected to the output of the repeater for transmitting the alternating voltages to the next repeater. Direct voltage for providing operating potentials within the repeater is also supplied over the same two conductors. Power separation filters 19 and 20 are included in the input and output, respectively, of the repeater for separating and recombining the alternating and direct voltages for utilization in their respective signal and power transmission channels in the repeater in a well-known manner. Filters 19 and 20 may also include shaping or equalizing networks as required.

In the power channel 21 a pair of series connected chokes 22 and 23 and a shunt connected capacitor 26 provide additional attenuation to signal frequencies. A resistor 27 is also connected in series in power channel 21 to develop operating potential for use in the repeater. Capacitor 25 shunts signal frequencies around resistor 27. The lower terminal 28 of capacitor 26 is conventionally designated sea ground for the cable system while its upper terminal 29 is chassis ground for the amplifiers of the repeater. The circled plus sign 30 connected to the ungrounded terminal of resistor 27 schematically represents operating potential of appropriate value applied to similarly designated points in the remainder of the repeater circuit.

In the signal channel 31 of the repeater two transistor amplifiers 32 and 33 are connected for redundant operation as working and spare amplifiers, respectively. A hybrid coil 36 couples the inputs of amplifiers 32 and 33 in multiple to the signal output of power separation filter 19. A hybrid balancing network 37 connects the center tapped secondary of coil 36 to chassis ground in the usual manner. Resistors 38 and 39 are connected in series between the terminals of the secondary winding of coil 36 and the inputs of amplifiers 32 and 33, respectively. These resistors may be selectively eliminated from the circuit by closing their respective low impedance shunts 40 and 41, as will be hereinafter described, to attenuate signals coupled to the spare amplifier to a greater extent than signals applied to the working amplifier. Some signal is available in the spare amplifier for control purposes, but the amplitude of the main portion of the signal in the working amplifier is not unnecessarily degraded.

Each of the amplifiers 32 and 33 comprises a three-stage transistor amplifier with alternate stage negative feedback. Feedback impedance networks 42 and 43 are similar to one another and are designed to give the amplifiers a gain-versus-frequency characteristic which is intended to compensate for attenuation in the intervening cable section over the band of signal and control frequencies primarily to be transmitted. The shape of the overall characteristic for a cable section plus its repeater includes an essentially flat gain portion of predetermined magnitude over the signal and control frequency ranges, but narrow bands of substantially higher gain are included in the control-frequency range as will be described. Capacitors 46 and 47 provide the feedback coupling from the third stage to the first stage, and they also build out the impedances of networks 42 and 43 at high frequencies to improve co-operation with crystals $f_1$ and $f_2$.

Signature crystals $f_1$ and $f_2$ are connected in shunt across the negative feedback paths of the amplifiers. As is well known in the art, each of these crystals has a relatively high impedance except when excited by a frequency in a narrow, critically defined, band. When so excited, the crystal resonates and presents a relatively low resistance to the circuit. The crystals have different resonant frequencies in the control frequency band which lies outside of the band of signal frequencies to be primarily transmitted through the system. The resonant frequency of each crystal in each amplifier throughout the system is different from the resonant frequency of every other crystal in the system, and such resonant frequencies are designated the signature frequencies of the amplifiers. As more fully described in the L. M. Ilgenfritz et al. Patent No. 2,580,097, issued December 25, 1951, the signature crystals are arranged to disable the normal negative feedback when excited at their respective resonant frequencies and thereby increase amplifier gain to produce an impulse in the respective amplifier output at the signature frequency. The impulse is of substantially larger magnitude than amplifier output impulses at other frequencies outside of the crystal resonant frequency range due to the absence of negative feedback at the signature frequency. Impulse magnitude may be adjusted by changing the setting of resistor 15 in FIG. 1. Detector 24 in east terminal 11 is provided for receiving signature frequency impulses. If an impulse at a certain signature frequency falls substantially below its normal amplitude, it is known that for some reason the gain in a corresponding repeater section is below normal.

Since the cable attenuation is greatest at the higher signal frequencies, networks 42 and 43 are designed to have low impedance in that range to permit a corresponding increase in gain. When signature frequencies are in a band above the transmitted information band, feedback capacitors 46 and 47 are designed to build out the impedances of networks 42 and 43 so that an adequate impedance is presented to the corresponding signature crystal to assure proper shunting at crystal resonance.

The output of an amplifier may thus include potentials in either the signal or the control frequency bands and the potential magnitude of such output is dependent upon the setting of resistor 15 and upon whether or not the signature crystal is in a resonant condition. When signal frequencies are applied to cable 12 with oscillator 13 disconnected, the amplifier output potential will be in a first amplitude range because the negative feedback is operative. If oscillator 13 is connected to supply signature frequency oscillations to cable 12, and if resistor 15 is set to fix the oscillation amplitude at a level suitable for testing working amplifiers as described in the Ilgenfritz et al. patent, the amplifier output may include potentials at the signature frequency of the amplifier in a second amplitude range which is higher than the first amplitude range because the signature crystal disables negative feedback. If resistor 15 is adjusted to enable oscillator 13 to supply larger amplitude signature oscillations, the amplifier output may include potentials at the amplifier signature frequency in a third still higher amplitude range because the feedback has been disabled by the crystal and the initial oscillation amplitude has been increased. Switching control may be exercised by utilizing the third amplitude range as hereinafter described.

Figure 3:
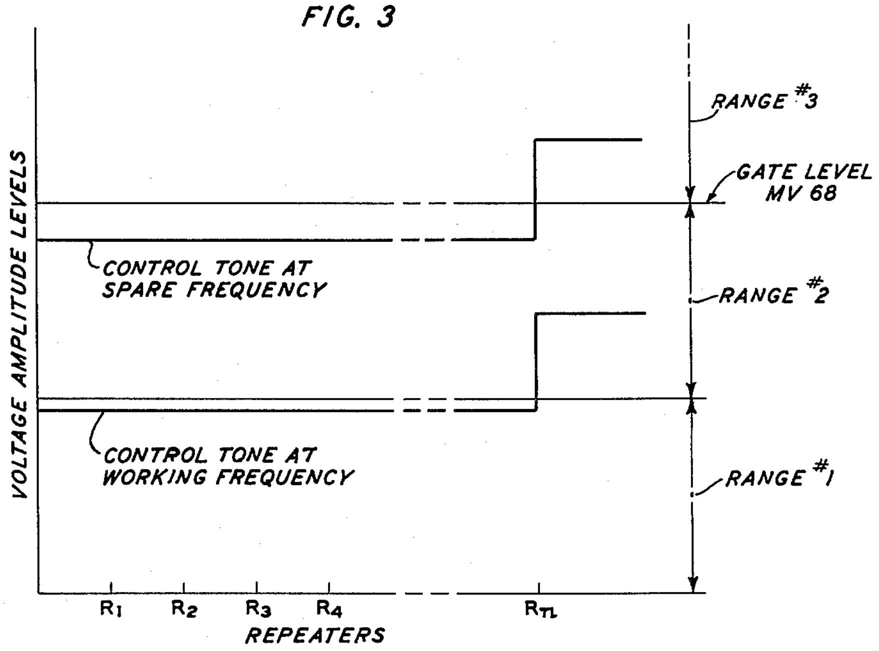
FIG. 3 is a voltage level diagram illustrating one aspect of the invention.

In FIG. 3 are shown for a repeater $R_n$ the relationships of the three-mentioned amplitude ranges to control tones at the working amplifier signature frequency for monitoring amplifier operation and at the spare amplifier signature frequency for actuating a control circuit. This is a simplified illustration to demonstrate magnitude relationships for amplifier output impulses produced by signature crystal resonance at one repeater, and no attempt is made to depict the numerous other effects that would be evident if one plotted an accurate level profile for a cable system.

Transformers 48 and 49 couple the outputs of amplifiers 32 and 33 to their respective loads. The terminals of the secondary winding of transformer 48 are directly coupled to the signal input of power separation filter 20 by the leads 51. The input of a control circuit 53 is directly coupled to the terminals of the secondary winding on transformer 49 by the leads 56. The secondary of transformer 48 is also cross coupled to the input of control circuit 53 by leads 58, and the secondary of transformer 49 is cross coupled to the signal input of filter 20 by the leads 60.

A resistor 62 connected across the input of control circuit 53 provides a relatively constant input impedance. A bandpass filter 63 in control circuit 53 has a non-critically defined pass-band which includes the resonant frequencies of all the signature crystals $f_1 \ldots f_{2n}$ in the cable system. Thus, only potentials at frequencies in the control frequency band of filter 63 may enter control circuit 53. These potentials are rectified in a suitable rectifier circuit 66, and the envelope of the rectified signal is extracted by a low-pass filter 67 for application to a gating circuit which is schematically represented as a bistable multivibrator 68. The filter 67 for this purpose can be quite simple and may comprise, for example, only a shunt capacitor which would attenuate the control frequency and pass the burst envelope.

Multivibrator 68 may, for example, be an emitter-coupled circuit with the input thereto applied across a common emitter impedance so that each input impulse to the same input terminals causes the multivibrator to be triggered from one conducting state to another. Many circuits of this type are well known in the art. Operating and bias potentials for multivibrator 68 are supplied from the power channel terminal 30 by any convenient arrangement for obtaining the various potentials required. A bias potential is selected which renders multivibrator 68 responsive to only those input impulses in the previously mentioned third amplitude range, i.e., those potentials in excess of a predetermined magnitude which is greater than the maximum anticipated amplifier output signal level with negative feedback, and also greater than signature impulses that result from testing the working amplifiers as described in the Ilgenfritz et al. patent. Thus, control circuit 53 can respond to only those input pulses which result from disabling an amplifier negative feedback circuit upon resonance in its signature crystal and which have a certain known minimum amplitude.

Signal amplitude in the absence of feedback is mentioned to provide a reference for describing the control impulse magnitude. Filter 63 is designed to pass only control frequencies so it is not necessary to keep signal frequencies within certain amplitude bounds to prevent false triggering.

Furthermore, by adding circuit elements, the use of amplitude gating for control purposes could be eliminated entirely. Thus, equivalent four-wire repeaters usually operate in two different frequency bands for the two directions of transmission. Each amplifier could be provided with two signature crystals, one resonating in each of the two directional transmission bands. With such an arrangement a first function could be performed in the high band under control from one terminal, and a second function could be performed in the low band under control from the other terminal.

A relay 70 is connected to the output of multivibrator 68 to be actuated in response to only one of the two stable operating conditions of the multivibrator. The operating contacts of relay 70 are illustrated in the usual manner for detached contact drawings wherein back, or normally closed, contacts are represented by a single line perpendicular to the lead in which they are connected while front, or normally open, contacts are illustrated by an $x$ across the lead in which they are connected. Normally closed contacts are those which are closed when the relay is in its resting, or de-energized, condition and normally open contacts are those which are open when the relay is resting in its de-energized condition.

In the normal operating condition of the repeater in FIG. 2, relay 70 is in its normal de-energized condition, amplifier 32 is the working amplifier, resistor 38 is shunted and shunt 41 is open circuited. Direct coupling leads 51 and 56 are operative and cross coupling leads 58 and 60 are open. Input frequencies are primarily directed to working amplifier 32 because resistor 39 causes amplifier 33 to have a high input impedance.

If variable frequency oscillator 13 in FIG. 1 is set to produce the signature frequency $f_2$ at the switching control amplitude level, and pulser 16 is actuated, a burst of control frequency at $f_2$ cycles per second is applied to the cable 12. This burst of control frequency is transmitted through the working amplifiers of the various repeaters. When the burst reaches the repeater of FIG. 2 having the signature crystal $f_2$ in the spare amplifier 33, the resulting impulse in the output of amplifier 33 is coupled through transformer 49 to control circuit 53 where it is passed by filter 63 and actuates multivibrator 68. Relay 70 operates and opens the direct connections 51 and 56 and closes the cross connections 58 and 60. Shunt 40 on resistor 38 is opened and resistor 39 is shunted. Now amplifier 33 is the working amplifier and amplifier 32 is the spare amplifier.

The duration of the control frequency burst is made somewhat shorter than the operating time of relay 70 so that no part of the control voltage impulse in the output of amplifier 33 will be coupled through cross connections 60 to subsequent repeaters after relay 70 has operated. If such an impulse were permitted to reach subsequent repeaters, it could be amplified by the spare amplifier therein in the manner of a normal signal and restored essentially to its original amplitude at the output of amplifier 33. Thus, this transmitted and amplified impulse might cause false operation of the control circuits in every following repeater.

When resistor 15 is adjusted to produce lower amplitude control oscillations for testing working amplifiers, each such amplifier produces its characteristic output impulse if excited by its signature frequency. Such impulses, however, do not actuate any control circuits 53 because they are of insufficient amplitude to trigger a multivibrator 68. Thus, the roll call function of the signature crystal is not impaired; rather, it is expanded to cooperate with bandpass filter 63 and multivibrator 68 to provide an efficient and economical remote control facility.

A typical transoceanic submarine cable system may include 50 or more repeaters of the type illustrated in FIG. 2. If each repeater includes working and spare amplifiers, 100 amplifiers with 100 different filters would be required to carry out prior art remote switching operations at each amplifier. Each filter would have a passband of about 20 cycles per second and include at least six circuit elements, including at least one quartz crystal to obtain the necessary selectivity. A band spacing of about another 180 cycles per second would be required to avoid interference between bands. In other words, a frequency band of about 20 kilocycles per second must be allotted for control purposes. Each repeater would have two filters, one for each amplifier and must necessarily include at least the corresponding 12 extra filter circuit elements.

In accordance with the invention a single band-pass filter design is employed. The control frequency bands for each amplifier can be much closer to one another, i.e. about 50 cycles apart, since the controlling factor is the sharpness of the signature crystal characteristic rather than the sharpness of the filter characteristic. Consequently, the filter 63 may have a pass-band of about 7500 cycles per second. The sharpness of the characteristic of this filter is no longer a primary consideration, so a simpler design employing only about four circuit elements may be employed; and for a repeater switching application, only one filter is now required for each repeater. Thus, the required control frequency band has been roughly halved, and the number of extra circuit elements required for filters in each repeater has been reduced to about one-third. In addition, the required control frequency band can also be used for signature frequency testing.

Although the invention has been described with reference to amplifier switching in a submarine cable system repeater, it is of course applicable to many remote control systems and is subject to considerable modification, all within the scope of the invention, as will be readily apparent to those skilled in the art.

What is claimed is:

1. A submarine cable transmission system having a plurality of repeaters each comprising a working amplifier, a spare amplifier, means connecting the inputs of said amplifiers in multiple in said cable system, a switch, means including said switch for connecting the output of said working amplifier in said cable system for through transmission of signals, each of said amplifiers including a signature crystal for producing an amplifier gain irregularity in a narrow frequency band which is characteristic of such amplifier, a control circuit connected to said switch, said control circuit including a filter having a pass-band which includes the characteristic signature frequency bands of all amplifiers in said system, and means also including said switch for applying a gain irregularity from said spare amplifier to said filter for actuating said switch to interchance said spare and working amplifiers.

2. An electric signal transmission system comprising two terminals, a plurality of repeaters, cable means interconnecting said repeaters to form a transmission path between said terminals, each repeater including means producing a gain irregularity in a predetermined individual narrow band of control frequencies whereby signals in said band appear in the output of said repeater at a first voltage level while signals at frequencies outside said band appear at a second voltage level, control means in each of said repeaters including a filter having a pass-band which includes all of the various predetermined frequency bands of said gain irregularity producing means in all of said repeaters, control utilization means, means responsive to voltage amplitudes at said first level and nonresponsive to amplitudes at said second level connecting the output of said filter to said utilization means, and means in at least one of said terminals connectable to said cable means for applying to said cable means selected frequencies in the pass-band of said filter for actuating utilization means in a selected repeater.

3. The electric signal transmission system in accordance with claim 2 in which each of said repeaters comprises two amplifiers, each of said amplifiers includes therein separate means producing a gain irregularity in response to a control frequency which is different for every amplifier in said system, the inputs of both amplifiers are connected to the output end of a first section of said cable means, means directly couple the output of one of said amplifiers to the input end of a second section of said cable means, means directly couple the output of a second one of said amplifiers to the input of said filter, means cross couple the output of said second amplifier to the input of said second cable section and cross couple the output of said first amplifier to the input of said filter, and said utilization means comprises an electromagnetic switching device having contacts in said direct coupling means and in said cross coupling means for selectively connecting either said direct or said cross coupling means in response to the actuation of said switch and simultaneously disconnecting the other one of said direct and cross coupling means.

4. The electric signal transmission system in accordance with claim 3 in which said means for producing gain irregularities comprises a separate piezoelectric crystal connected in a feedback path for each of said amplifiers to disable the feedback in response to a resonant frequency of the crystal and thereby produce a pulse in the amplifier output, said pulse comprising a signature voltage pulse for transmission to one of said terminals when the corresponding amplifier output is connected to said second cable section and said pulse alternately being a control voltage pulse for co-operating with said filter to actuate said switch when the corresponding amplifier output is connected to said filter.

5. The electric signal transmission system in accordance with claim 3 which comprises in addition a separate resistor connected in series in the input of each of said amplifiers, a separate low impedance direct connection shunting each of said resistors, and additional contacts of said switching means connected in series in each of said shunt connections for shunting out the resistor that is connected in series in an amplifier having its output coupled to said second cable section and for opening the shunt around the resistor in the other amplifier input.

6. In a repeater for use in a submarine cable transmission system for electric signals in a predetermined broad band of frequencies the combination of an amplifier, means in said amplifier producing an irregularity in the gain-versus-frequency characteristic thereof in response to a predetermined narrow band of signal frequencies included within said broad band for producing a voltage impulse of distinctive amplitude in the output of said amplifier, utilization means, a control circuit responsive to impulses of said amplitude in said predetermined band of frequencies for actuating said utilization means, and means coupling said control circuit between the output of said amplifier and said utilization means.

7. The repeater combination in accordance with claim 6 in which said amplifier includes two amplification channels having the inputs thereof connected in multiple for receiving input signals, means connecting the output of one of said channels to a signal transmission circuit, means connecting the output of the other of said channels to said control circuit, each of said channels including means responsive to a narrow band of control frequencies for producing a voltage impulse in the output thereof, the control frequency band for each of said channels being completely different from the band for the other channel, and said utilization means comprises a switch for interchanging the outputs of said two channels in response to an actuating signal applied to said repeater at the control frequency of the channel which is then connected to said control circuit.

8. The repeater combination in accordance with claim 7 comprising in addition a separate resistor connected in series in the input of each of said channels, a separate low impedance shunt connected between the terminals of each of said resistors, and contacts of said switching means connected in each of said shunts for short-circuiting the resistance in the input of the channel connected to said signal transmission circuit and for open-circuiting the shunt in the input of the amplifier that is connected to said control circuit.

9. The combination in a repeater for use in a submarine cable transmission system comprising an amplifier having a through signal amplification capability in a broad band of frequencies and having a negative feedback circuit, means responsive to a predetermined narrow band of frequencies within said broad band for disabling said feedback circuit and thereby producing a voltage impulse in the output of said amplifier at said narrow band of frequencies, utilization means, and a control circuit coupling the output of said amplifier to said utilization means, said control circuit including frequency selecting means having a pass-band which includes said predetermined frequency band, and amplitude selecting means responsive only to voltages in excess of amplifier output voltage with operative negative feedback.

10. In combination, an amplifier comprising frequency sensitive means producing a voltage impulse in the output of said amplifier in response to an applied signal within a predetermined narrow band of frequencies, said amplifier having through signal amplification capabilities in a broad band of frequencies including said narrow band, a through signal transmission path for signals in said broad band, utilization means, a control circuit for coupling said utilization means to the output of said amplifier, said control circuit comprising both frequency and amplitude detecting means limiting the coupling effect of said control circuit to amplifier output signals in said narrow band and which signals also have an amplitude in excess of the amplitude of output signals from said amplifier at frequencies which are outside said narrow band, and said utilization means including means connecting the output of said amplifier either to said coupling means or to said path in response to said impulse.

11. A submarine cable transmission system having a plurality of repeaters each comprising a working amplifier, a spare amplifier, means connecting the inputs of said amplifiers in multiple in said cable system, a switch, means including said switch for connecting the output of said working amplifier in said cable system for the through transmission of signals, each of said amplifiers including a frequency-sensitive device responsive to a different narrow critically defined frequency band for producing an amplifier gain irregularity in said band, a control circuit connected to said switch, said control circuit including a filter having a non-critically defined pass-band with a breadth at least equal to the product of the frequency breadth of said narrow band times the number of said frequency-sensitive devices in said system, and means also including said switch for applying a gain irregularity from said spare amplifier to said filter for actuating said switch to interchange said spare and working amplifiers.

12. In a system for selectively controlling from a single location a plurality of devices at different remote locations, a variable frequency source of energy at said single location, means transmitting a selected frequency from said source to all of said remote locations for controlling a device at only one of said remote locations, and means at each remote location responsive to only an individual narrow band of frequencies for actuating the device at such location, the last-mentioned means comprising means producing a voltage impulse of predetermined minimum amplitude when energized at a frequency in the individual band for such remote location, a filter connected to said impulse producing means and having a pass-band that includes the individual narrow bands of the responsive means at all of said remote locations, and gating means connected to said filter and responsive only to input voltage impulses at amplitudes which are at least equal to said minimum amplitude for actuating said utilization device.

13. In a submarine cable transmission system comprising two terminals interconnected by a cable and a plurality of electric signal repeaters spaced along the length of said cable, each of said repeaters comprising a working amplifier and a spare amplifier, the improvement which comprises means connecting the inputs of said amplifiers in multiple for receiving signals from said cable, a negative feedback path for each of said amplifiers, a piezoelectric crystal connected in shunt in each of said feedback circuits for disabling such feedback circuit and thereby producing a voltage impulse in the output of the respective amplifier at the resonant frequency of the crystal, each of the crystals in each of said repeaters having a different resonant frequency, means directly connecting the output of said working amplifier to apply amplified signals to said cable, a control circuit, means directly connecting the output of said spare amplifier to the input of said control circuit, cross connections for coupling the output of the working amplifier to the input of said control circuit and for cross connecting the output of said spare amplifier to apply amplified signals to said cable, said control circuit comprising a filter having a pass-band which includes all of said resonant frequencies for said cable system, a bistable multivibrator biased for response to only those signals in excess of the output of said amplifiers with operative negative feedback, means including said filter connecting the input of said multivibrator to the output of said control circuit, and a relay connected to an output of said multivibrator, said relay having back contacts in each of said direct connections and having front contacts in each of said cross connections, separate resistors connected in series in the input of each of said amplifiers, a direct connection shunting each of said resistors, a set of back contacts of said relay arranged in series in the shunt associated with the input of said working amplifier and a set of front contacts of said relay connected in series in the shunt associated with the input of said spare amplifier.

14. In a submarine cable transmission system two cable system terminals, a cable connecting said terminals together, signal repeaters spaced through the length of said cable, each of said repeaters having two amplifiers, a working amplifier and a spare amplifier, a control circuit, controlled means connected to said control circuit, said working amplifier normally connected for signal transmission in said cable and said spare amplifier normally connected to couple signals from said cable to said control circuit, a signature crystal in each of said amplifiers for producing an amplifier output voltage of a larger amplitude at the resonant frequency of said crystal than at said other frequencies, each crystal in said system having a different resonant frequency, means in at least one of said terminals selectively applying signature frequencies at a first voltage level to said cable for checking the operation of each of said working amplifiers, means in said one terminal applying said signature frequencies at a second and higher level for actuating selectively the control circuit of a predetermined repeater, said control circuit comprising frequency-sensitive means responsive to all signature frequencies of said system, and said control circuit also comprising amplitude selecting means responsive to only those impulses generated by signature frequencies applied to said cable at levels greater than said first level.

References Cited in the file of this patent

UNITED STATES PATENTS

| | | |
|---|---|---|
| 2,580,097 | Ilgenfritz | Dec. 25, 1951 |
| 2,680,162 | Brehm | June 1, 1954 |
| 2,790,033 | Keiper | Apr. 23, 1957 |